United States Patent [19]

Ikeda et al.

[11] Patent Number: 5,768,402
[45] Date of Patent: Jun. 16, 1998

[54] CODE DATA WRITING-ONCE APPARATUS FOR RECORDING WRITING-ONCE CODE DATA IN UNRECORDED WRITING-ONCE BLOCKS OF OPTICALLY READABLY PRINTED AND RECORDED CODE DATA

[75] Inventors: Masaru Ikeda, Fujimi; Wang Lifang, Sagamihara; Naoaki Ishikawa, Hachioji; Yasuhiko Kawauchi, Hachioji; Takuya Kawabe, Hachioji, all of Japan

[73] Assignee: Olympus Optical Co., Ltd., Tokyo, Japan

[21] Appl. No.: 536,700

[22] Filed: Sep. 29, 1995

[30] Foreign Application Priority Data

Oct. 6, 1994 [JP] Japan ................... 6-242667
Oct. 6, 1994 [JP] Japan ................... 6-242668

[51] Int. Cl.⁶ ................................. G06K 9/00
[52] U.S. Cl. ................. 382/100; 382/235; 235/462
[58] Field of Search ..................... 382/100, 235, 382/309, 311; 235/437, 454, 462; 395/792, 803; 707/530, 540

[56] References Cited

U.S. PATENT DOCUMENTS 5,051,779  9/1991  Hikawa ................... 355/200
5,274,468  12/1993  Ojha ....................... 358/448
5,454,054  9/1995  Iizuka ..................... 382/321
5,473,152  12/1995  Apter et al. .............. 235/494
5,513,264  4/1996  Wang et al. .............. 380/51

*Primary Examiner*—Andrew W. Johns
*Attorney, Agent, or Firm*—Frishuaf, Holtz, Goodman, Langer & Chick

[57] ABSTRACT

In a code data edit apparatus, dot code data read by an optical read unit is input to a processing function unit. In the processing function unit, the dot code data is decoded, and the processing result is displayed on a screen display unit. Upon reception of an instruction and data from a change input unit, the dot code data is edited in the processing function unit, and this process is displayed on the screen display unit in real time. The edit result is output by an edit output unit. In a dot code data writing-once apparatus, a data information determination unit is connected to the output stage of a dot code data read unit through a decoding unit. A display unit is connected to the output stage of the data information determination unit. The data information determination unit is connected to the output stage of a data input unit for inputting writing-once data. A coding unit for receiving data from the data input unit and the data information determination unit is also connected to the output stage of the data input unit. The result from the coding unit is sent to a write unit connected to the output stage of the coding unit.

4 Claims, 11 Drawing Sheets

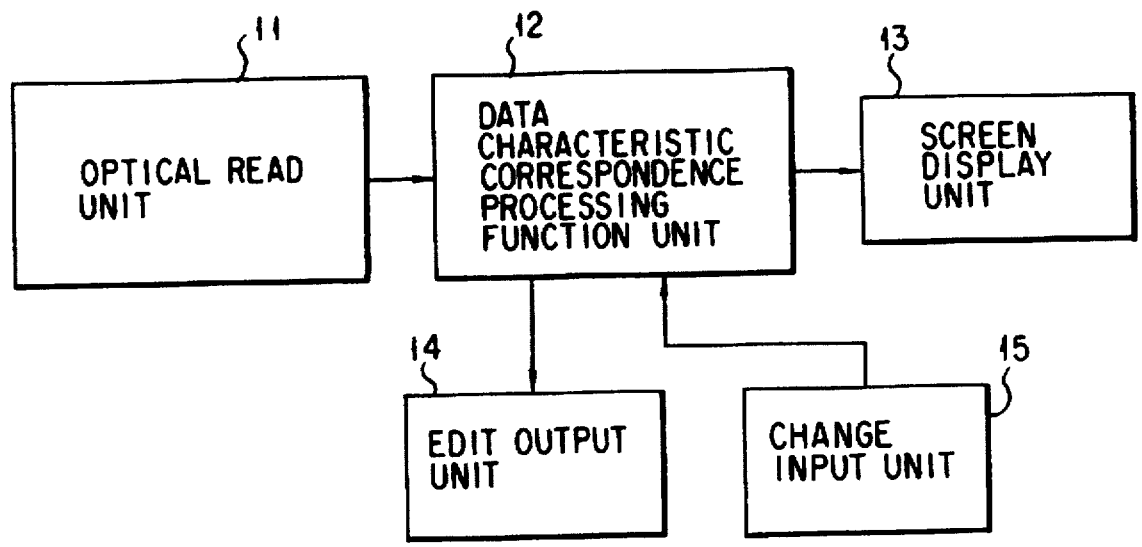
F I G. 1A
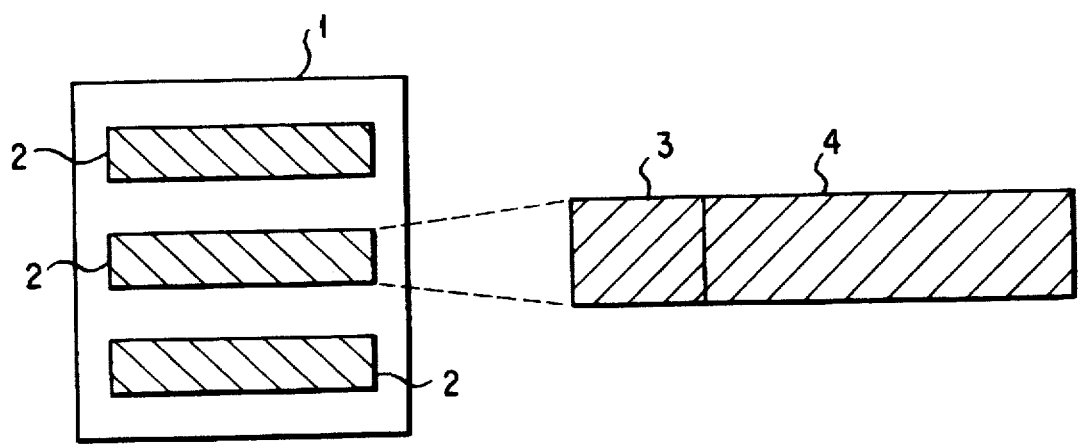
F I G. 1B

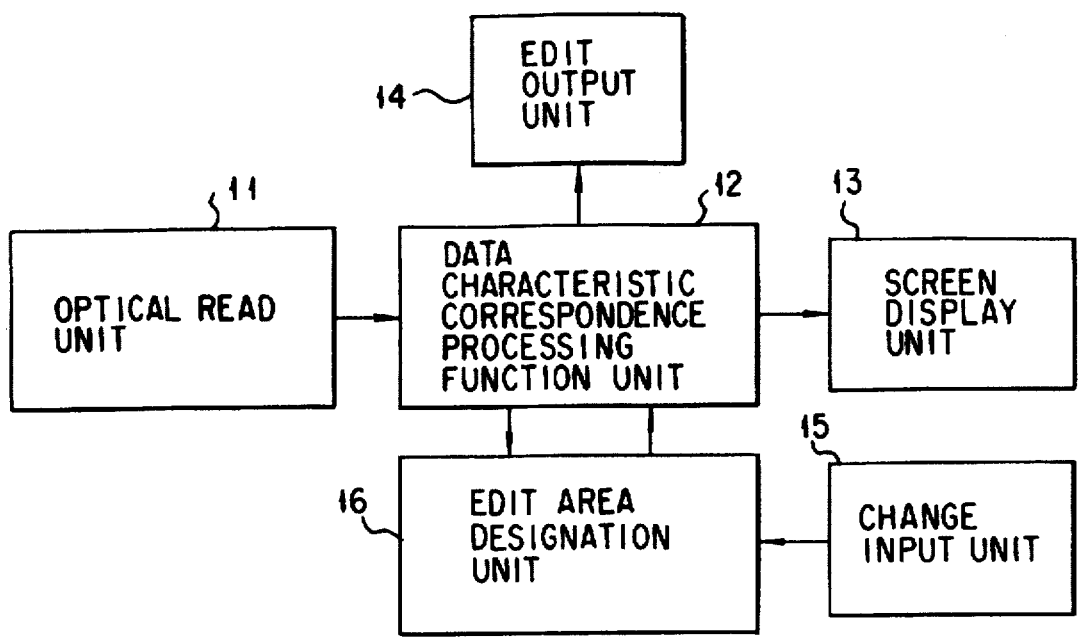
F I G. 2
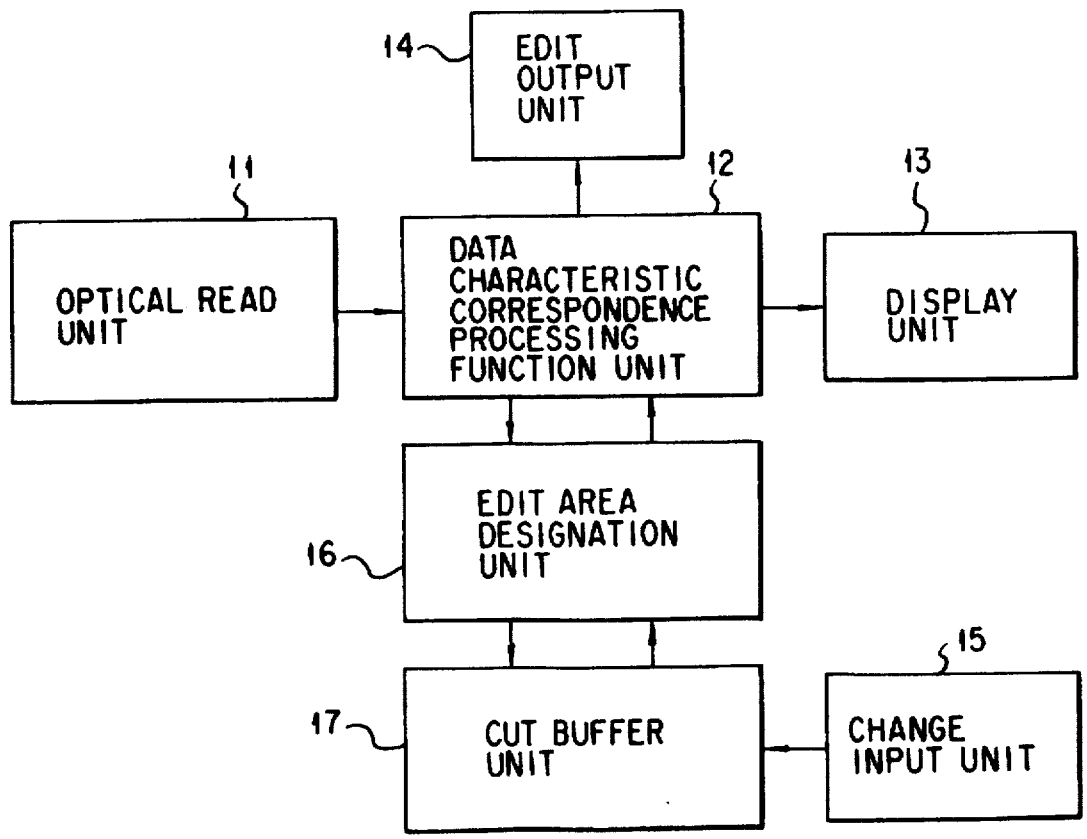
F I G. 3

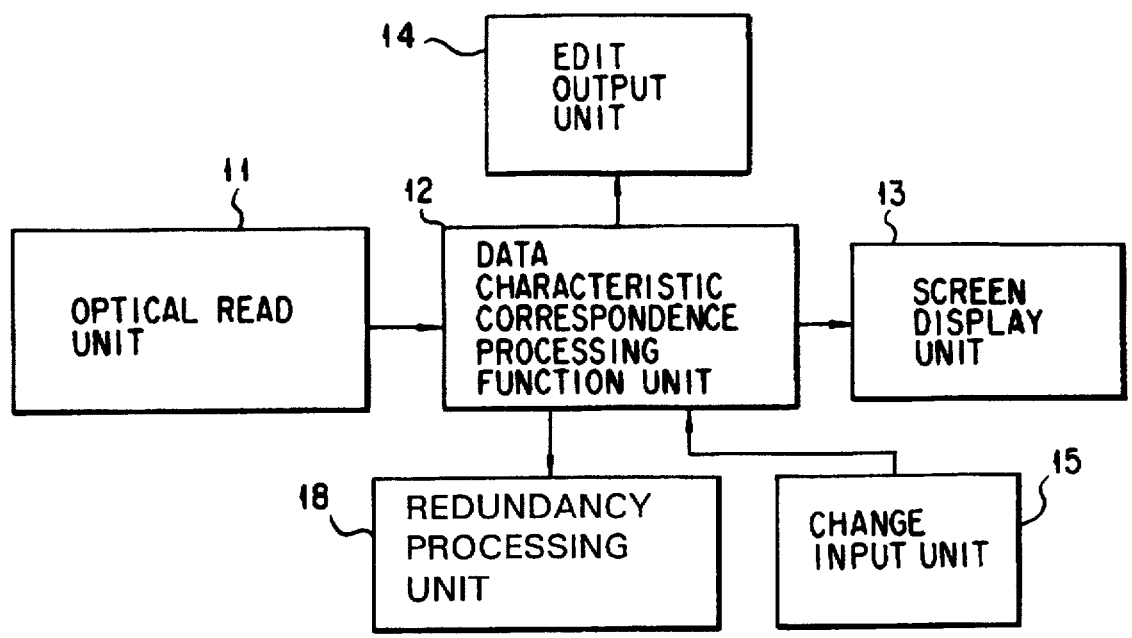
F I G. 4
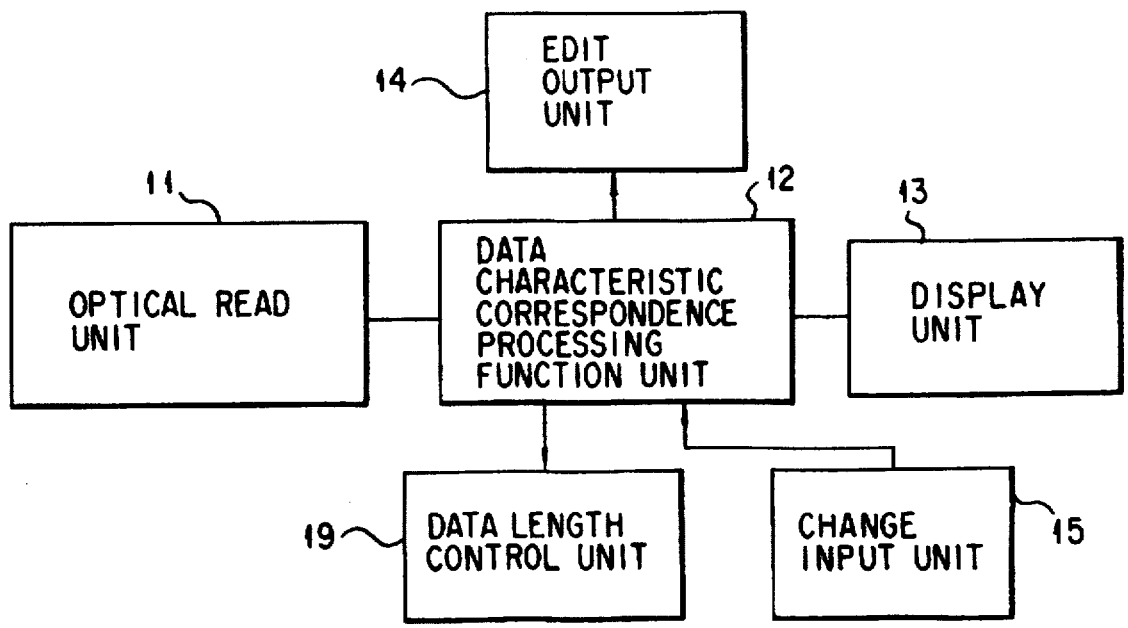
F I G. 5

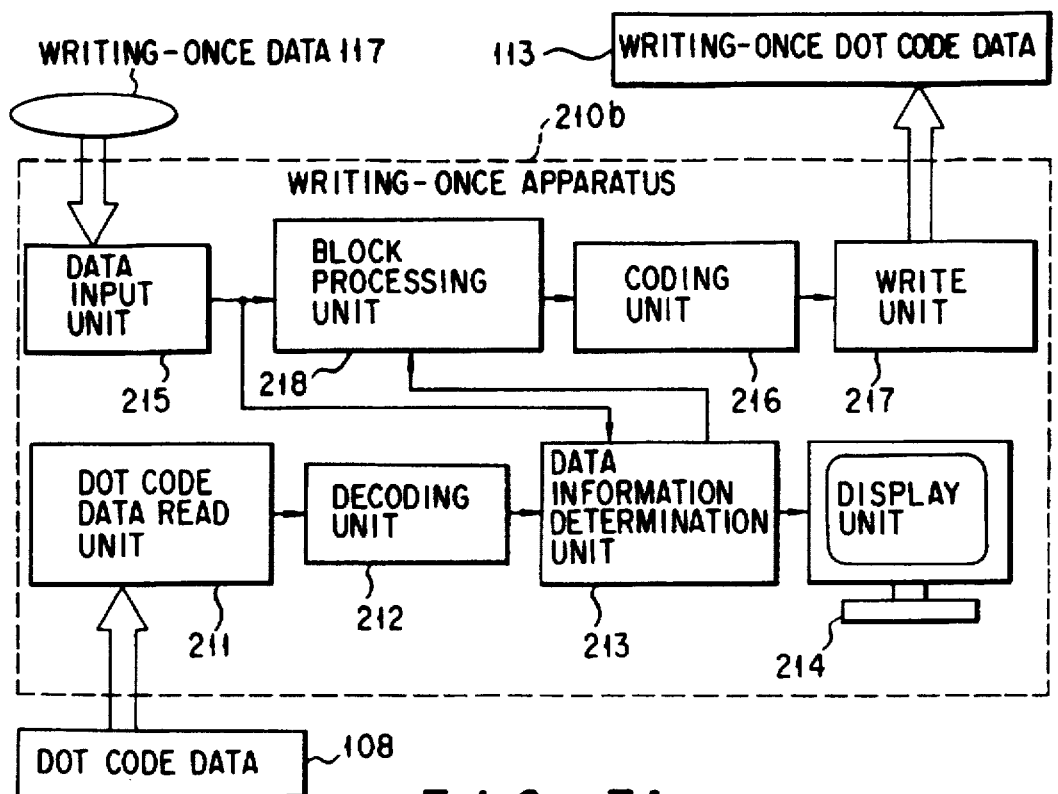
F I G. 7A
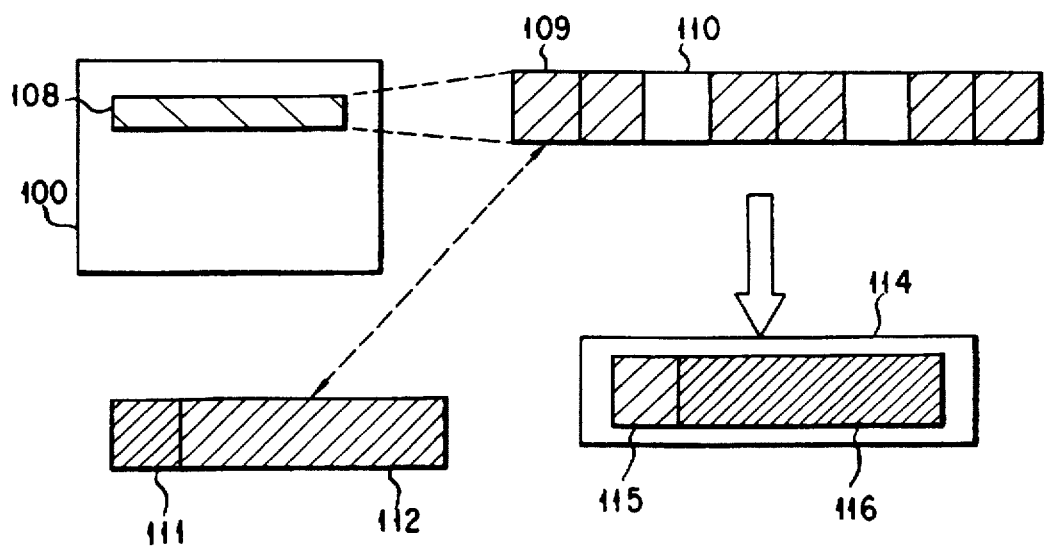
F I G. 7B

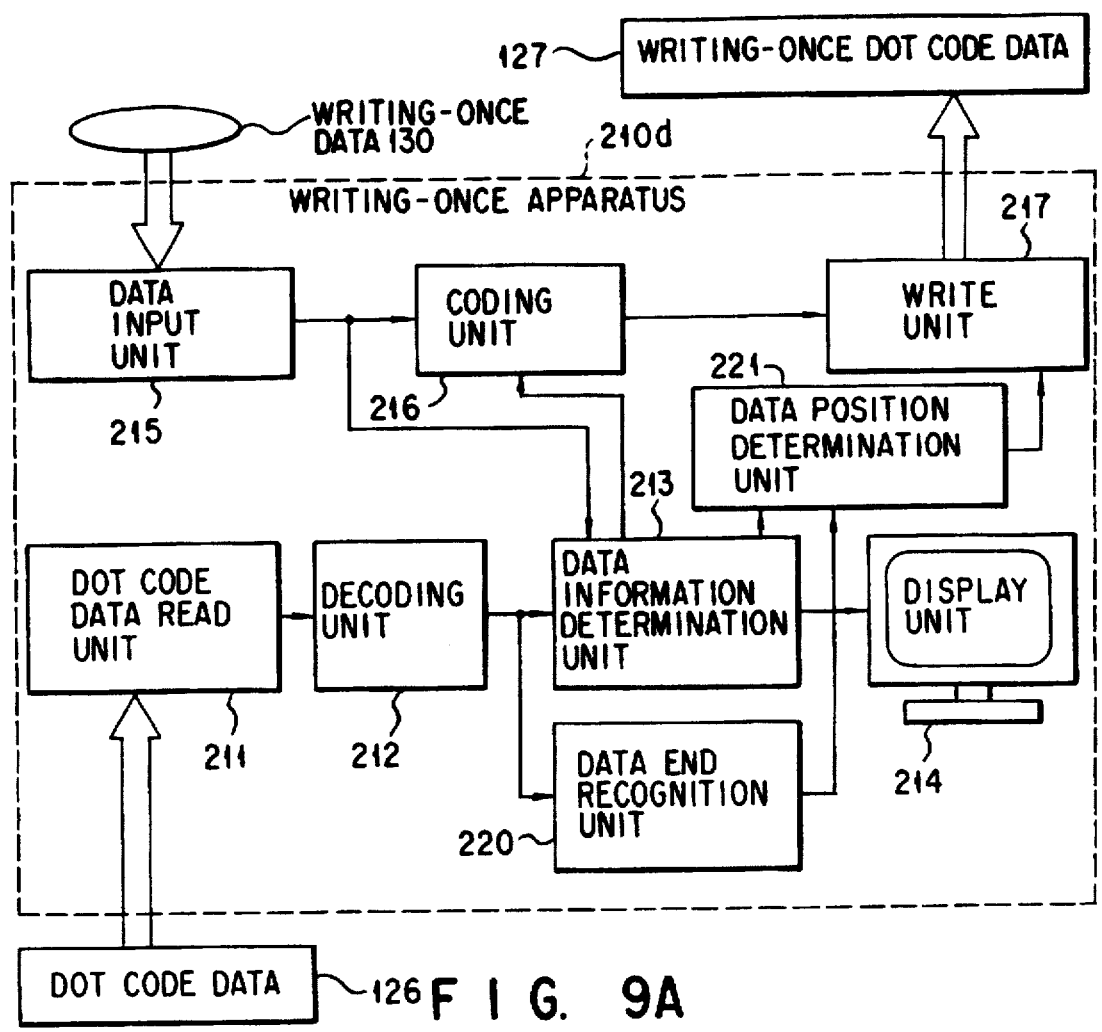
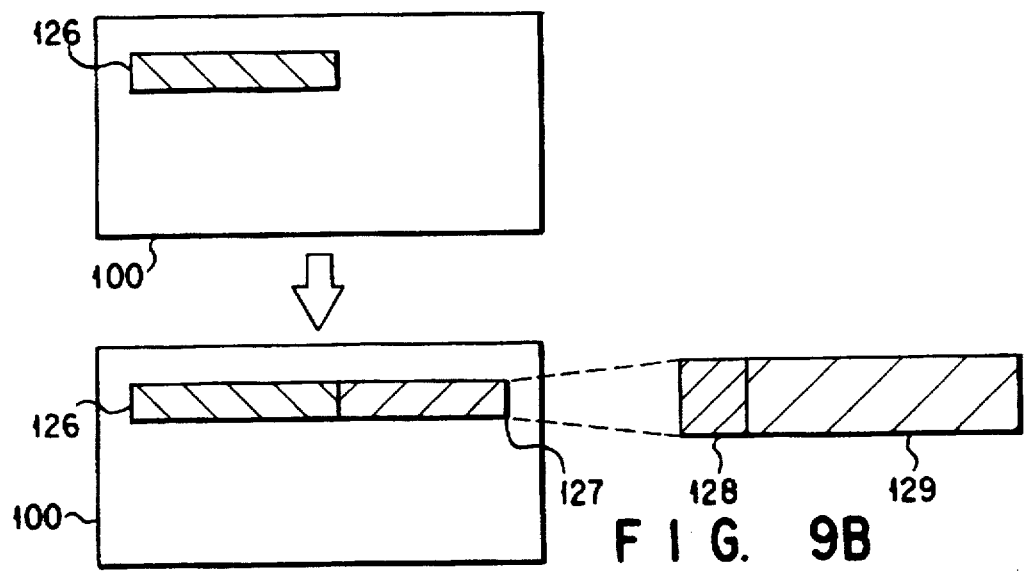

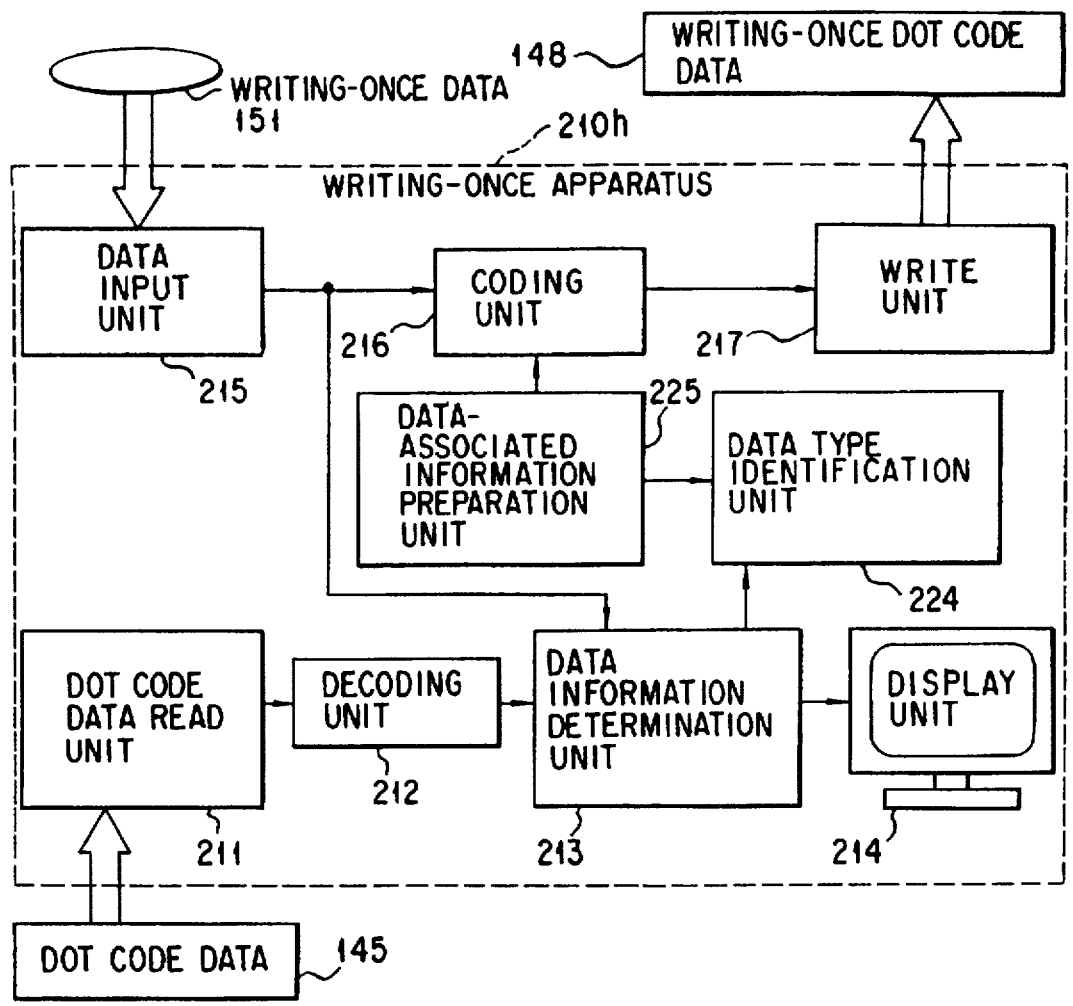
F I G. 13

CODE DATA WRITING-ONCE APPARATUS FOR RECORDING WRITING-ONCE CODE DATA IN UNRECORDED WRITING-ONCE BLOCKS OF OPTICALLY READABLY PRINTED AND RECORDED CODE DATA

BACKGROUND OF THE INVENTION

1. Field of the Invention

The present invention generally relates to a code data processing apparatus and, more particularly, to a code data processing apparatus which optically reads code data from a recording medium in which multimedia information including at least one of audio information, image information, and character information is recorded as optically readable code data and performs edit processing or writing-once processing.

2. Description of the Related Art

In recent years, optical information recording media on which coded data such as a bar code and a two-dimensional bar code are printed are used in a variety of fields. Generally, a processing apparatus for processing an optical information recording medium of this type uses only a single data structure and consists of a data input unit and a coding unit, which correspond to data coded in accordance with a specific scheme.

The conventional processing apparatus with the above arrangement is normally present not as an edit apparatus but as a data write apparatus which edits and codes data before coding.

On the other hand, the conventional optical information processing apparatus for optically reading information from a medium having printed code data only performs decoding processing of coded data. For this reason, the conventional processing apparatus has only a function of decoding the coded data. Therefore, the apparatus has no function of editing coded data, i.e., the apparatus cannot edit coded data.

The code data processing apparatus for reading and writing optical information consisting of coded data normally has a data input function, a data output function, a coding function, a decoding function, a read function, and a write function.

The above-described conventional code data processing apparatus has a function of reading and writing only independent information of single code data.

However, the conventional code data processing apparatus processes single data. In addition, since coded data has predetermined size and structure, no data information can be further written in the coded data.

In the conventional apparatus, to write data once in coded data; single code data must be independently and parallelly printed as needed. Therefore, discrimination or relationship between the original information and the written information cannot be established, so that information as to the once written information cannot be obtained.

SUMMARY OF THE INVENTION

It is, therefore, an object of the present invention to provide a new and improved code data processing apparatus in which code data can be optically read from a recording medium in which multimedia information including at least one of audio information, image information, and character information is recorded as optically readable code data, thereby easily performing predetermined post-processing including edit processing and writing-once processing.

The present invention has been made in consideration of the above problems, and has as its another object to provide a code data information edit apparatus capable of performing edit processing, which can read code data and perform edit processing of code data information on a display screen.

It is still another object of the present invention to provide a code data information edit apparatus capable of performing edit processing which can display data on a display screen and perform edit processing in correction of code information.

The present invention has been made in consideration of the above problems, and has as its still another object to provide a code data writing-once apparatus capable of performing code data writing-once processing to the code data.

It is still another object of the present invention to provide a code data writing-once apparatus which can determine discrimination or relationship between original information and written information and have information as once written information.

According to an aspect of the present invention, there is provided a code data processing apparatus comprising:

read means for optically reading code data from a recording medium in which multimedia information including at least one of audio information, image information, and character information is recorded as optically readable code data;

identification means for identifying a type and structure of the code data read by the read means;

display means for displaying code data corresponding to the code data identified by the identification means; and post-processing means for performing post-processing of the code data, wherein the identification means performs post-processing including at least one of edit processing and writing-once processing of the code data in accordance with an instruction from the post-processing means with reference to the code data displayed on the display means.

According to another aspect of the present invention, there is provided a code data edit apparatus capable of performing edit processing, comprising:

read means for optically reading code data from a recording medium in which multimedia information including at least one of audio information, image information, and character information is recorded as optically readable code data;

identification means for identifying a type and structure of the code data read by the read means;

display means for displaying code data corresponding to the code data identified by the identification means; and change means for changing the code data, wherein the identification means edits the code data in accordance with an instruction from the change means with reference to the code data displayed on the display means.

According to still another aspect of the present invention, there is provided a code data writing-once apparatus comprising:

read means for reading code data recorded on a recording medium from which one of audio information, image information, and character information can be optically read;

decoding means for decoding the code data read by the read means;

input means for inputting writing-once data;

determination means for determining the code data decoded by the decoding means and the data input from the input means to arrange a writing-once area in the code data, coding means for coding the data to the writing-once code data in the writing-once area arranged by the determination means, the data being input from the input means, and write means for writing the writing-once code data coded by the coding means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1A is a block diagram showing the arrangement of a code data edit apparatus according to the first embodiment of the present invention;

FIG. 1B is a view showing the structure of code data;

FIG. 2 is a block diagram showing the arrangement of code data edit apparatus according to the second embodiment of the present invention;

FIG. 3 is a block diagram showing the arrangement of a code data edit apparatus according to the third and fourth embodiments of the present invention;

FIG. 4 is a block diagram showing the arrangement of a code data edit apparatus according to the fifth embodiment of the present invention;

FIG. 5 is a block diagram showing the arrangement of a code data edit apparatus according to the sixth and seventh embodiments of the present invention;

FIG. 7A is a block diagram showing the arrangement of a dot code data writing-once apparatus according to the ninth embodiment of the present invention;

FIG. 7B is a view showing the structure of dot code data;

FIG. 9A is a block diagram showing the arrangement of a dot code data writing-once apparatus according to the 11th embodiment of the present invention;

FIG. 9B is a view showing the structure of dot code data;

FIG. 13 is a block diagram showing the arrangement of a dot code data writing-once apparatus according to the 15th embodiment of the present invention.

DETAILED DESCRIPTION OF THE PREFERRED EMBODIMENTS

Figure 6A:
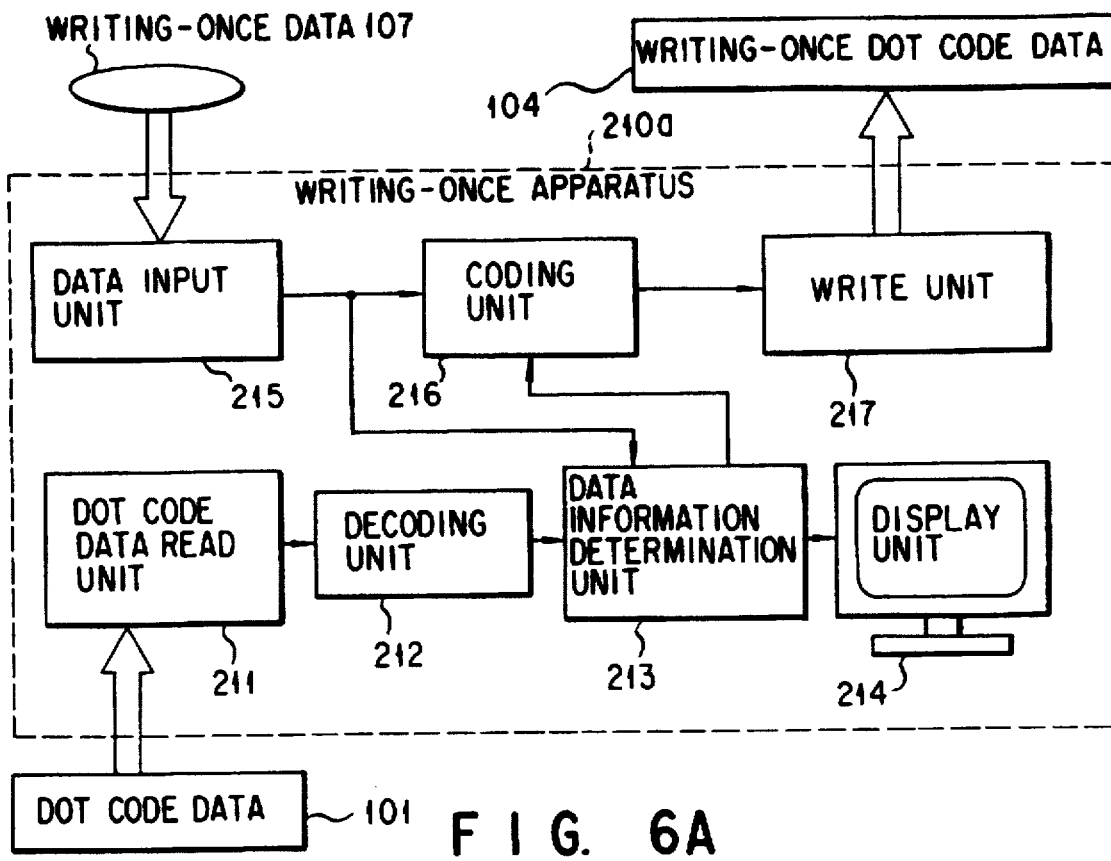
FIG. 6A is a block diagram showing the arrangement of a dot code data writing-once apparatus according to the eighth embodiment of the present invention.

Reference will now be made in detail to the presently preferred embodiments of the invention as illustrated in the accompanying drawings, in which like reference characters designate like or corresponding parts throughout the several drawings.

Embodiments of a code data edit apparatus according to the present invention will be described below with reference to the accompanying drawings.

FIG. 1A is a block diagram showing a code data edit apparatus according to the first embodiment of the present invention, which can edit code data.

Referring to FIG. 1A, a data characteristic correspondence processing function unit (to be referred to as a processing function unit hereinafter) 12 for decoding code data 2 (to be described later) is connected to the output stage of an optical read unit 11 for reading a dot code. A screen display unit 13 and an edit output unit 14 are connected to the output stage of the processing function unit 12. A change input unit 15 is connected to the processing function unit 12 as another input.

FIG. 1B is a view showing the structure of code data. The dot code data 2 as code data from which multimedia information including at least one of audio information, image information, and character information can be optically read is printed on a recording medium 1 such as a sheet surface. In the dot code data 2, a data characteristic identification code 3 is located at the start portion, and a data code 4 is located subsequent to the data characteristic identification code 3.

In the code data edit apparatus with the above arrangement, which can edit code data, when the dot code data 2 is read by the optical read unit 11, the read dot code data 2 as an output from the optical read unit 11 is input to the processing function unit 12. In the processing function unit 12, the dot code data 2 is decoded, and the type and structure of the dot code data are identified. The processing result is sent to the screen display unit 13.

In the processing function unit 12, the dot code data 2 is edited upon reception of an instruction and data from the change input unit 15. This process is displayed on the screen display unit 13 in real time. The edit result is output by the edit output unit 14.

As described above, the information of the dot code data 2 is displayed on the screen display unit 13. The operator can easily edit data in correspondence with the edit content and operation through the change input unit 15 while observing the screen display unit 13. Therefore, the operability of edit processing can be improved.

The second embodiment of the present invention will be described below. In the following embodiments, the same reference numerals denote the same constituent elements, and a detailed description thereof will be omitted.

FIG. 2 is a block diagram showing the arrangement of a code data edit apparatus according to the second embodiment of the present invention.

Referring to FIG. 2, a processing function unit 12 is connected to the output stage of an optical read unit 11 for reading a dot code. A screen display unit 13, an edit output unit 14, and an edit area designation unit 16 are connected to the output stage of the processing function unit 12. A change input unit 15 is connected to the edit area designation unit 16.

With this arrangement, when dot code data 2 is read by the optical read unit 11, the output from the optical read unit 11 is input to the processing function unit 12. In the processing function unit 12, the dot code data 2 is decoded, and the type and structure of the dot code are identified. The dot code data 2 corresponding to only an edit portion is output to the screen display unit 13 by the edit area designation unit 16.

The processing function unit 12 receives an instruction and data from the change input unit 15 through the edit area designation unit 16 and edits the dot code data 2. This process is displayed on the screen display unit 13 in real time. The edit result is output by the edit output unit 14.

As described above, the information of dot code data corresponding to only an edit portion is displayed on the screen display unit 13. The operator can easily edit data in correspondence with the edit content and operation through the change input unit 15 and the edit area designation unit 16 while observing the screen display unit 13. Therefore, the operability and efficiency of edit processing are improved.

The third embodiment of the present invention will be described below.

FIG. 3 is a block diagram showing the arrangement of a code data edit apparatus according to the third embodiment.

A processing function unit 12 is connected to the output stage of an optical read unit 11. A screen display unit 13, an edit output unit 14, and an edit area designation unit 16 are connected to the output stage of the processing function unit 12. A change input unit 15 is connected to the edit area designation unit 16 through a cut buffer unit 17.

Dot code data 2 is read by the optical read unit 11 and output to the processing function unit 12. In the processing function unit 12, the dot code data 2 is decoded, and the type and structure of the dot code data are identified. The dot code data 2 corresponding to only an edit portion is sent to the screen display unit 13 by the edit area designation unit 16.

Upon reception of an instruction and data from the change input unit 15, which are placed in the cut buffer unit 17, the processing function unit 12 performs change processing of a set of dot code data. This process is displayed on the screen display unit 13 in real time. The edit result is output by the edit output unit 14.

As described above, the information of dot code data in an area necessary for edit processing is displayed on the screen display unit 13. The operator moves a set of dot code data via the cut buffer unit 17 through the change input unit 15 while observing the screen display unit 13. With this arrangement, a plurality of large units of code data can be easily edited. Therefore, the operability of edit processing is improved.

The fourth embodiment of the present invention will be described below.

A code data edit apparatus according to the fourth embodiment has the same arrangement as that in the third embodiment shown in FIG. 3. Therefore, only an operation will be described.

When dot code data 2 is read by an optical read unit 11, the output from the optical read unit 11 is input to a processing function unit 12. In the processing function unit 12, the dot code data 2 is decoded, and the type and structure of the dot code data are identified. The information of only an edit portion corresponding to the type of the dot code data 2 is sent to a screen display unit 13 by an edit area designation unit 16.

Upon reception of an instruction and data from the change input unit 15, which are placed in the cut buffer unit 17, the processing function unit 12 performs change processing of a set of dot code data. This process is displayed on the screen display unit 13 in real time. The edit result is output by an edit output unit 14.

As described above, the information of dot code data in only an area necessary for edit processing is displayed on the screen display unit 13 in accordance with the type of data. The operator moves a set of dot code data via the cut buffer unit 17 through the change input unit 15 while observing the screen display unit 13. With this arrangement, a plurality of large units of code data can be easily edited. Therefore, the operability and efficiency of edit processing are improved.

The fifth embodiment of the present invention will be described below.

FIG. 4 is a block diagram showing the arrangement of a code data edit apparatus according to the fifth embodiment of the present invention.

Referring to FIG. 4, a screen display unit 13, an edit output unit 14, and a redundancy processing unit 18 are connected to the output stage of a processing function unit 12 whose input stage is connected to an optical read unit 11. A change input unit 15 is connected to the processing function unit 12 as another input.

When dot code data 2 is read by the optical read unit 11, the output from the optical read unit 11 is input to the processing function unit 12. In the processing function unit 12, the dot code data 2 is decoded, and the type and structure of the dot code data are identified. The result is sent to the screen display unit 13.

In the processing function unit 12, an input from the change input unit 15 is coded again using the redundancy processing unit 18, and change processing of the dot code data 2 is performed. This process is displayed on the screen display unit 13 in real time. The edit result is output by the edit output unit 14.

As described above, the information of the dot code data 2 is displayed on the screen display unit 13. The operator can easily edit the dot code data 2 in correspondence with the edit content and operation through the change input unit 15 while observing the screen display unit 13. In addition, the information of the dot code data 2 has a redundancy. With this arrangement, redundancy processing is performed in correspondence with the edit content and operation. Therefore, the operability and efficiency of edit processing of dot code data can be improved.

The sixth embodiment of the present invention will be described below.

FIG. 5 is a block diagram showing the arrangement of a code data edit apparatus according to the sixth embodiment of the present invention.

Referring to FIG. 5, a screen display unit 13, an edit output unit 14, and a data length control unit 19 are connected to the output stage of a processing function unit 12 whose input stage is connected to an optical read unit 11. A change input unit 15 is connected to the processing function unit 12 as another input.

In the edit apparatus with the above arrangement, when dot code data 2 is read by the optical read unit 11, the output from the optical read unit 11 is input to the processing function unit 12. In the processing function unit 12, the dot code data 2 is decoded, and the type and structure of the dot code data are identified. The result is sent to the screen display unit 13.

In the processing function unit 12, an input from the change input unit 15 is converted into variable-length data by the data length control unit 19, and change processing of the code data is performed. This process is displayed on the screen display unit 13 in real time. The edit result is output by the edit output unit 14.

As described above, the information of the dot code data 2 is displayed on the screen display unit 13. The operator can easily edit the dot code data 2 in correspondence with the edit content and operation through the change input unit 15 while observing the screen display unit 13. In addition, the information of dot code data is converted into variable-length data. With this process, the operability and efficiency of edit processing of dot code data are improved independently of data sizes.

The seventh embodiment of the present invention will be described below.

A code data edit apparatus according to the seventh embodiment has the same arrangement as that in the sixth embodiment shown in FIG. 5. Therefore, only an operation will be described.

When dot code data 2 is read by an optical read unit 11, the output from the optical read unit 11 is input to a processing function unit 12. In the processing function unit 12, the dot code data 2 is decoded, and the type and structure of the dot code data are identified. The information is sent to a screen display unit 13 in accordance with the structure of the dot code data 2. In the processing function unit 12, an input from a change input unit 15 is converted into variable-length data by a data length control unit 19, and change processing of the dot code data is performed.

As described above, the information of the dot code data 2 is displayed on the screen display unit 13. The operator can easily edit the dot code data 2 in correspondence with the edit content and operation through the change input unit 15 while observing the screen display unit 13. In addition, the dot code data can be edited in accordance with the structure of the dot code data 2. Therefore, the operability and efficiency of edit processing of the dot code data are improved independently of the data structure.

According to the first to seventh embodiments of the present invention, the following arrangements can be obtained.

(1) A code data edit apparatus capable of performing edit processing, which optically reads code data from a recording medium in which multimedia information including at least one of audio information, image information, and character information is recorded as optically readable code data and performs edit processing, comprising
identification means for identifying a type and structure of the code data,
display means for displaying code data corresponding to the data, and
change means for changing the code data,
wherein the identification means edits the code data in accordance with an instruction from the change means with reference to the code data displayed on the display means.

(2) A code data edit apparatus capable of performing edit processing according to the arrangement (1), further comprising processing means for decoding the code data, and input means for inputting a correction portion of the code data, so that only the correction portion can be changed when the display means displays the correction portion input from the input means.

(3) A code data edit apparatus capable of performing edit processing according to the arrangement (1), further comprising processing means for decoding the code data, input means for inputting a correction portion of the code data, and moving means for allowing movement of an arrangement of the code data, so that the code data can be edited when the display means displays an area necessary for the correction portion input from the input means.

(4) A code data edit apparatus capable of performing edit processing according to the arrangement (1), further comprising processing means for decoding the code data, input means for inputting a correction portion of the code data, and designation means for designating an area necessary for the correction portion in accordance with the type of the code data, so that the code data can be edited when the display means displays the area necessary for the correction portion.

(5) A code data edit apparatus capable of performing edit processing, which optically reads code data from a recording medium in which multimedia information including at least one of audio information, image information, and character information is recorded as optically readable code data, comprising
identification means for identifying a type and structure of data, and
designation means for designating a redundancy of the data,
wherein the identification means edits the data in accordance with an instruction from the designation means.

(6) A code data edit apparatus capable of performing edit processing, which optically reads code data from a recording medium in which multimedia information including at least one of audio information, image information, and character information is recorded as optically readable code data, comprising
identification means for identifying a type and structure of data, and
change/correction means for changing and correcting data having a variable-length structure,
wherein the identification means edits the data in accordance with an instruction from the change/correction means.

(7) A code data edit apparatus capable of performing edit processing, which optically reads code data from a recording medium in which multimedia information including at least one of audio information, image information, and character information is recorded as optically readable code data, comprising
identification means for identifying a type and structure of data, the identification means performing edit processing in accordance with characteristics of the code data structure.

According to the arrangement (1), information is displayed on the display unit when code data is read by the edit apparatus, and change processing of the code data is performed in accordance with an input from the change input unit. The information of the code data corresponding to the edit content and operation is displayed. Therefore, the operability of edit processing is improved.

According to the arrangement (2), information of only an edit portion is displayed on the display unit when code data is read by the edit apparatus, and change processing of the code data is performed in accordance with an input from the change input unit. Only the information of code data corresponding to the edit contents and operation is displayed. Therefore, edit processing can be easily performed, and the operability is improved.

According to the arrangement (3), the information of an area necessary for edit processing is displayed on the display unit when code data is read by the edit apparatus. A set of dot code data is placed in the cut buffer unit and changed in accordance with an input from the change input unit. A set of code data is moved via the cut buffer unit. Therefore, a plurality of large units of code data can be easily edited, and the operability is improved.

According to the arrangement (4), the information of an area necessary for edit processing is displayed on the display unit by the processing function unit when code data is read by the edit apparatus. Change processing for edit processing is performed by the processing function unit in accordance with an input from the change input unit. The information of code data in an area necessary for edit processing is displayed on the display unit in accordance with the type of data. Therefore, edit processing of code data can be easily performed in accordance with the type of data, and the operability is improved.

According to the arrangement (5), information is displayed on the display unit when code data is read by the edit apparatus. An input from the change input unit is coded again by the redundancy processing unit, and change processing of the code data is performed. Since the information of the code data has a redundancy, redundancy processing corresponding to the edit contents and operation is performed. Therefore, the operability of edit processing of the code data is improved.

According to the arrangement (6), information is displayed on the display unit when code data is read by the edit apparatus. The data length control unit performs change processing of variable-length code data upon reception of an input from the change input unit. Therefore, the operability of information edit processing of code data is improved without being influenced by the data size.

According to the arrangement (7), information is displayed on the display unit when code data is read by the edit apparatus. The code data processing function unit performs change processing of the code data in accordance with the characteristics of the data structure upon reception of an input from the change input unit.-Edit processing of the code data can be performed in accordance with the data structure. Therefore, the operability of edit processing of code data information is improved without being influenced by the data structure.

As described above, according to the first to seventh embodiments of the present invention, a code data information edit apparatus capable of performing edit processing, which can read code data and perform edit processing of code data information on the display screen, can be provided.

In addition, according to the first to seventh embodiments of the present invention, a code data information edit apparatus capable of performing edit processing, which can display the data on the display screen and perform edit processing in correction of code data information, can be provided.

Embodiments of a code data writing-once apparatus according to the present invention will be described below with reference to the accompanying drawings.

Figure 6B:
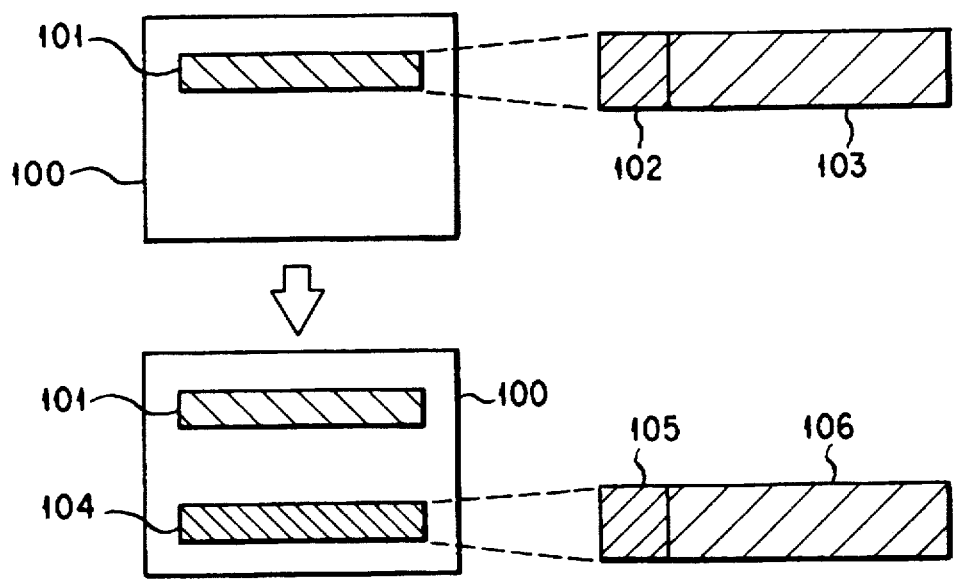
FIG. 6B is a view showing the structure of dot code data.

FIG. 6A is a block diagram showing the arrangement of a dot code data writing-once apparatus according to the eighth embodiment of the present invention. FIG. 6B is a view showing the structure of dot code data.

In a dot code data writing-once apparatus 210a, a data information determination unit 213 is connected to the output stage of a dot code data read unit 211 through a decoding unit 212. A display unit 214 is connected to the output stage of the data information determination unit 213. The data information determination unit 213 is connected to the output stage of a data input unit 215 for inputting writing-once data. A coding unit 216 for receiving data from the data input unit 215 and the data information determination unit 213 is also connected to the output stage of the data input unit 215. The result from the coding unit 216 is sent to a write unit 217 connected to the output stage of the coding unit 216.

Dot code data 101 as described above is printed on a sheet surface 100. In the dot code data 101, an information code 102 is located at the start portion, and a data code 103 is located subsequent to the information code 102. Similarly, in writing-once dot code data 104, a writing-once information code 105 is located at the start portion, and a writing-once data code 106 is located subsequent to the writing-once information code 105.

With this arrangement, when the dot code data 101 printed on the sheet surface 100 is read by the dot code data read unit 211, the information code 102 and the data code 103 are read. These read codes are decoded to an understandable form by the decoding unit 212.

The information obtained upon decoding the information code 102 is output to the data information determination unit 213 as information data, and an area for the writing-once dot code data 104 is determined. The result obtained upon decoding the data code 103 is displayed on the display unit 214 as preceding data.

Writing-once data 107 is input from the data input unit 215. The writing-once data 107 and the preceding data are displayed on the display unit 214 as uncoded understandable information. As a result, a data writing-once state by a writing-once operation is displayed. The operator performs the writing-once operation while observing the screen of the display unit 214.

The writing-once relationship information between the writing-once data 107 and the preceding data, the writing-once area, and the writing-once information are determined by the data information determination unit 213. These pieces of information are coded to the writing-once information code 105 by the coding unit 216. The writing-once data 107 is also coded to the writing-once data code 106 by the coding unit 216. With this processing, coding to the writing-once dot code data 104 is performed. With this code, the writing-once dot code data 104 is written by the write unit 217.

As described above, the dot code data 101 has the information code 102, the writing-once dot code data 104 has the writing-once information code 105, and the writing-once relationship information, the writing-once area, and the writing-once information are generated by the data information determination unit 213. With this arrangement, writing-once processing of dot code data can be performed.

The ninth embodiment of the present invention will be described below with reference to FIGS. 7A and 7B. In the following embodiments, the same reference numerals denote the same constituent elements, and a detailed description thereof will be omitted.

A dot code data writing-once apparatus 210b has a dot code data read unit 211, a decoding unit 212, a data information determination unit 213, and a display unit 214. The dot code data writing-once apparatus 210b also has a data input unit 215, a block processing unit 218 for receiving data from the data input unit 215 and the data information determination unit 213, a coding unit 216, and a write unit 217.

Dot code data 108 printed on a sheet surface 100 consists of a plurality of fixed-length data blocks 109, and writing-once areas 110 each having the same size as that of the corresponding data block 109. In each data block 109, an information code 111 is located at the start portion, and a data code 112 is located subsequent to the information code 111.

Similarly, writing-once dot code data 113 consists of a plurality of fixed-length writing-once blocks 114. A writing-once information code 115 is located at the start portion of each writing-once block 114, and a writing-once data code 116 is located subsequent to the writing-once information code 115.

With this arrangement, the dot code data 108 printed on the sheet surface 100 is read by the dot code data read unit 211. With this operation, the information code 111 and the data code 112 are read. These read codes are decoded to an understandable form by the decoding unit 212.

The information obtained upon decoding the information code 111 is sent to the data information determination unit 213 as information data. The writing-once area 110 for the writing-once dot code data 113 is determined. The result obtained upon decoding the data code 112 is displayed on the display unit 214 as preceding data.

The writing-once relationship information between the writing-once data 117 and the preceding data, the writing-once block, and the writing-once information are determined by the data information determination unit 213. On the basis of these information, the writing-once data is arranged in the writing-once area 110 by the block processing unit 218, and the data is sent to the coding unit 216.

An output from the data information determination unit 213 is coded to the writing-once information code 115 by the coding unit 216. Similarly, the writing-once data 117 is coded to the writing-once data code 116 by the coding unit 216. With this processing, coding to the writing-once dot code data 113 is performed. Each writing-once block 114 of this code is written in the writing-once area 110 by the write unit 217, thereby writing the writing-once dot code data 113.

As described above, the dot code data 108 consists of the fixed-length dot data blocks 109, and the writing-once areas 110 each having the same size as that of the corresponding dot data block 109. The writing-once dot code data 113 also consists of the fixed-length writing-once blocks 114. The writing-once relationship information, the writing-once area, and the writing-once information are generated by the data information determination unit 213. Therefore, writing-once processing of fixed-length dot code data as a block, in which the writing-once data is arranged in the writing-once area by the block processing unit 218, can be easily performed.

Figure 8A:
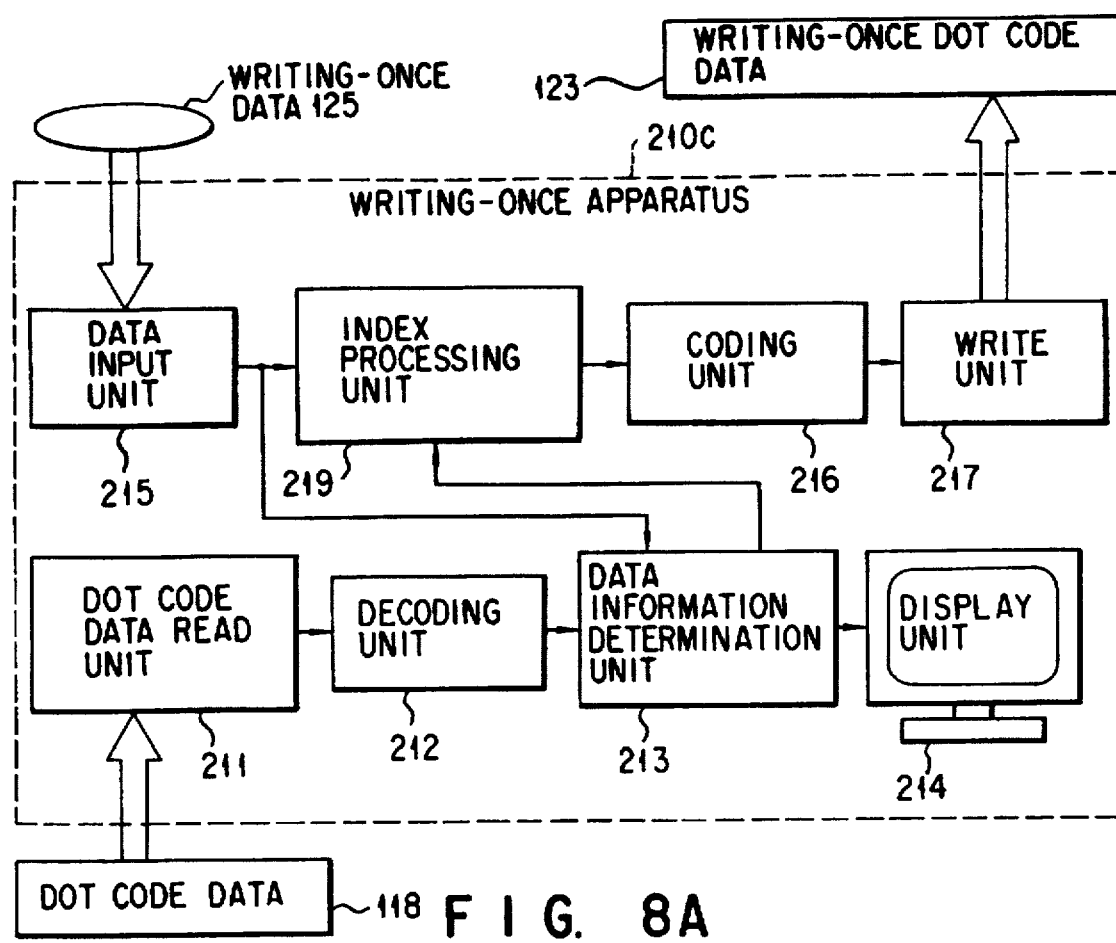
FIG. 8A is a block diagram showing the arrangement of a dot code data writing-once apparatus according to the 10th embodiment of the present invention.
Figure 8B:
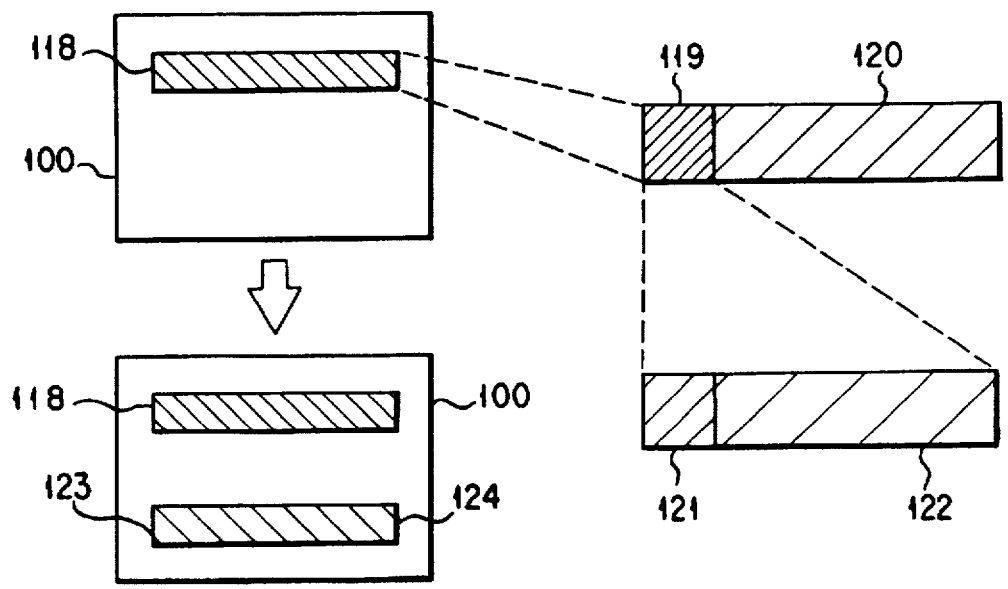
FIG. 8B is a view showing the structure of dot code data.

The 10th embodiment of the present invention will be described below with reference to FIGS. 8A and 8B.

A dot code data writing-once apparatus 210c has a dot code data read unit 211, a decoding unit 212, a data information determination unit 213, a display unit 214, a data input unit 215, an index processing unit 219 for receiving data from the data input unit 215 and the data information determination unit 213, a coding unit 216, and a write unit 217.

Dot code data 118 printed on a sheet surface 100 consists of an information code 119 and a data code 120 located subsequent to the information code 119. The information code 119 includes an index area 121 and an index code 122.

Writing-once dot code data 123 consists of the index code 122 and a writing-once data code 124.

With this arrangement, when the dot code data 118 printed on the sheet surface 100 is read by the dot code data read unit 211, the information code 119 and the data code 120 are read. These read codes are decoded to an understandable form by the decoding unit 212. The information obtained upon decoding the information code 119 is sent to the data information determination unit 213 as information data, and the area for the writing-once dot code data 123 is determined. The result obtained upon decoding the data code 120 is displayed on the display unit 214 as preceding data.

Writing-once data 125 is input from the data input unit 215. The writing-once data 125 and the preceding data are displayed on the display unit 214 as uncoded understandable information. As a result, a data writing-once state by a writing-once operation is displayed. The operator performs the writing-once operation while observing the display screen.

The writing-once relationship information between the writing-once data 125 and the preceding data, the writing-once index information, and the writing-once information are determined by the data information determination unit 213. On the basis of these pieces of information, data for the index area 121 is prepared by the index processing unit 219 and sent to the coding unit 216.

In the coding unit 216, an output from the data information determination unit 213 is coded to the index code 122. The writing-once data 125 is also coded as the writing-once data code 124 by the coding unit 216. With this processing, coding to the writing-once dot code data 123 is performed.

Thereafter, the index code 122 is written in the index area 121, and the writing-once data code 124 is written in the writing-once area by the write unit 217. With this operation, the writing-once dot code data 123 is written. Since the index code 122 has a size associated with the writing-once relationship information, the index code 122 can have a predetermined size without being influenced by the amount of the writing-once data code 124.

As described above, the dot code data 118 has the index area 121. The writing-once information of the writing-once dot code data 123 is written in the index area 121 as the index code 122. The writing-once relationship information, the writing-once area, and the writing-once information are generated by the data information determination unit 213. The writing-once data is arranged in the writing-once area by the index processing unit 219. With this arrangement, writing-once processing of dot code data in an indefinite amount can be easily performed using the index code 122 having a predetermined size, independently of the amount of the writing-once data code 124.

The 11th embodiment of the present invention will be described below.

FIG. 9A is a block diagram showing the arrangement of a dot code data writing-once apparatus according to the 11th embodiment of the present invention. FIG. 9B is a view showing the structure of dot code data.

In a dot code data writing-once apparatus 210d, a data information determination unit 213 and a data end recognition unit 220 are connected to the output stage of a dot code data read unit 211 through a decoding unit 212. A display unit 214 is connected to the output stage of the data information determination unit 213, and a data position determination unit 221 is also connected to the output stage of the data information determination unit 213. The data position determination unit 221 is connected to the output stage of the data end recognition unit 220. The output stage of the data position determination unit 221 is connected to a write unit 217.

The data information determination unit 213 is connected to the output stage of a data input unit 215 for inputting writing-once data. In addition, a coding unit 216 for receiving data from the data input unit 215 and the data information determination unit 213 is connected to the output stage of the data input unit 215. The result from the coding unit 216 is sent to the write unit 217 connected to the output stage of the coding unit 216.

Dot code data 126 is printed on a sheet surface 100. In dot code data 127 to be written once to the dot code data 126, a writing-once information code 128 is located at the start portion, and a writing-once data code 129 is located subsequent to the writing-once information code 128.

With this arrangement, the dot code data 126 printed on the sheet surface 100 is read by the dot code data read unit 211. These read codes are decoded and converted into understandable preceding data by the decoding unit 212 and sent to the data information determination unit 213.

The data from the decoding unit 212 is monitored by the data end recognition unit 220. Upon recognition of the data end, this information is sent to the data position determination unit 221.

Writing-once data 130 is input from the data input unit 215. The writing-once data 130 and the preceding data are determined as uncoded understandable information by the data information determination unit 213 and displayed on the display unit 214.

When the writing-once information of the writing-once data 130 and the preceding data is determined by the data information determination unit 213, the writing-once data is sent to the coding unit 216 on the basis of this information. The writing-once information is coded to the writing-once information code 128. The writing-once data 130 is also coded to the writing-once data code 129 by the coding unit 216. With this processing, coding to the writing-once dot code data 127 is performed.

Upon reception of a signal from the data end recognition unit 220, the data position determination unit 221 operates the write unit 217. Until a writing-once completion signal is received from the data information determination unit 213, the writing-once dot code data 127 from the coding unit 216 is written. Upon reception of the completion signal, the operation of the write unit 217 is completed.

As described above, the data end recognition unit 220 for recognizing the end of the dot code data 126, and the data position determination unit 221 for determining the start and end of the writing-once dot code data 127 are arranged. With this arrangement, writing-once processing of dot code data can be easily performed at a high operability and a high degree of freedom with respect to a writing-once data amount.

The 12th embodiment of the present invention will be described below.

Figure 10A:
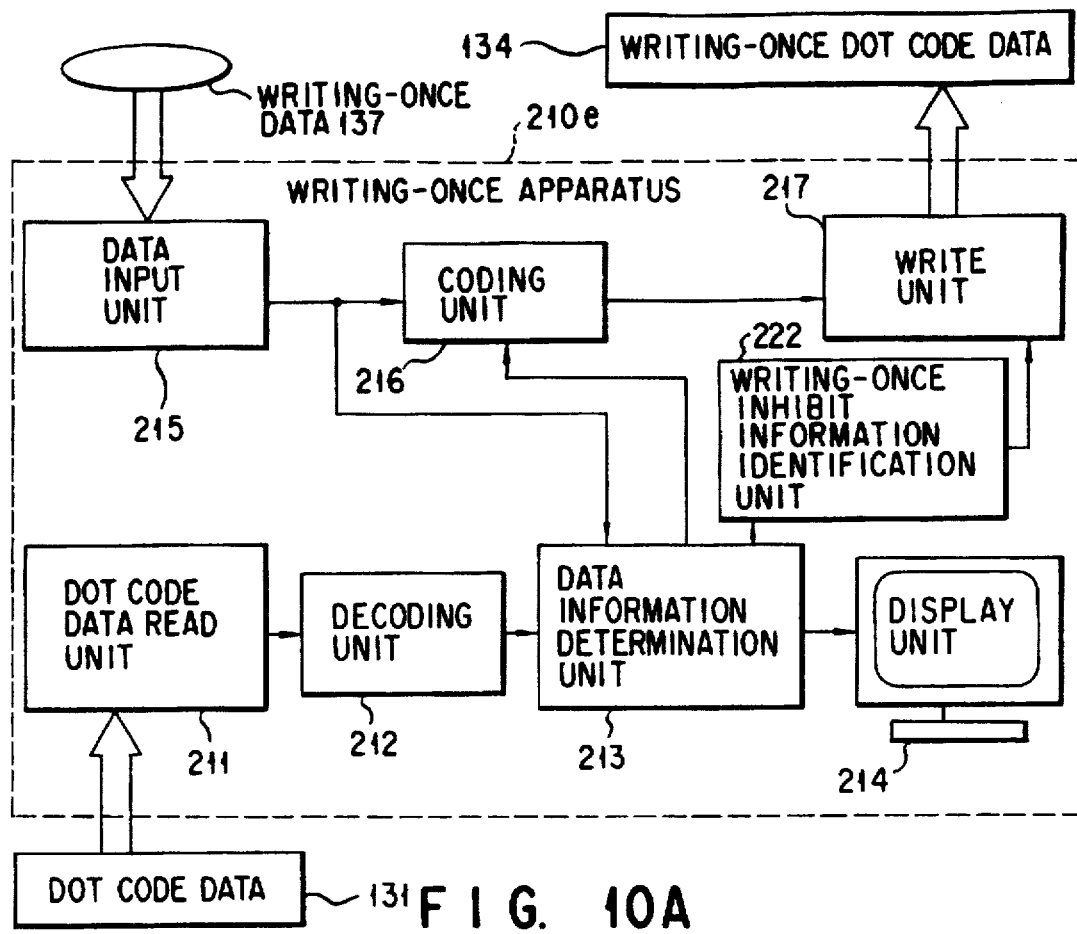
FIG. 10A is a block diagram showing the arrangement of a dot code data apparatus according to the 12th embodiment of the present invention.
Figure 10B:
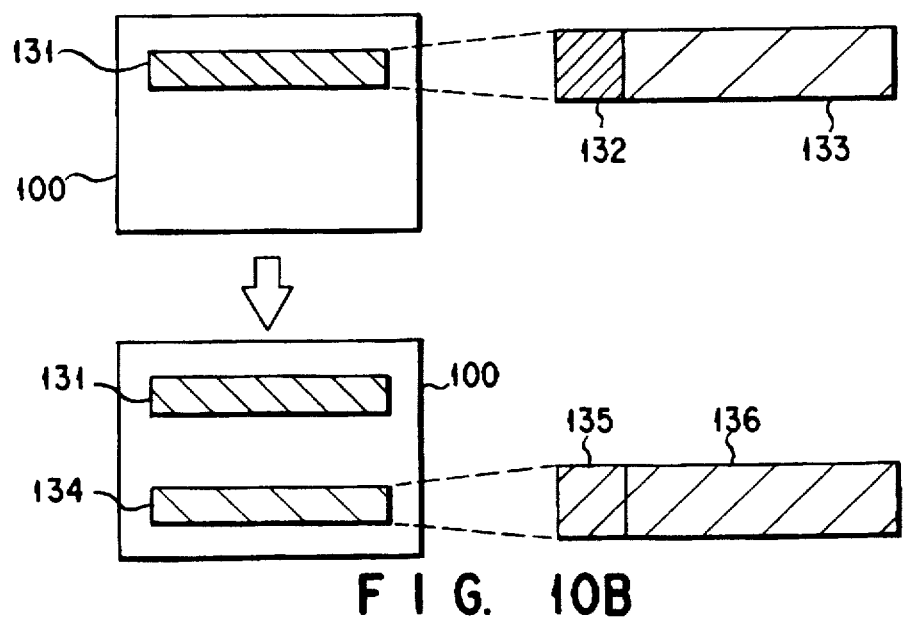
FIG. 10B is a view showing the structure of dot code data.

FIG. 10A is a block diagram showing the arrangement of a dot code data writing-once apparatus according to the 12th embodiment of the present invention. FIG. 10B is a view showing the structure of dot code data.

A dot code data writing-once apparatus 210e has a dot code data read unit 211, a decoding unit 212, a data information determination unit 213, a display unit 214, a data input unit 215, a coding unit 216, a write unit 217, and a writing-once inhibit information identification unit 222 for receiving data from the data input unit 215 and the data information determination unit 213 and outputting the data to the write unit 217.

In dot code data 131 printed on a sheet surface 100, an information code 132 is located at the start portion, and a data code 133 is located subsequent to the information code 132. Similarly, in writing-once dot code data 134, a writing-once information code 135 is located at the start portion, and a writing-once data code 136 is located subsequent to the writing-once information code 135.

When the dot code data 131 printed on the sheet surface 100 is read by the dot code data read unit 211, the information code 132 and the data code 133 are read. These read codes are decoded to an understandable form by the decoding unit 212.

The information obtained upon decoding the information code 132 is sent to the data information determination unit 213 as information data, and the area for the writing-once dot code data 134 is determined. The data code 133 is converted into preceding data by the decoding unit 212 and sent to the display unit 214.

Writing-once data 137 is input from the data input unit 215. The writing-once data 137 and the preceding data are displayed on the display unit 214 as uncoded understandable information. As a result, a data writing-once state by a writing-once operation is displayed.

The writing-once relationship information between the writing-once data 137 and the preceding data, the writing-once area, and the writing-once information are determined by the data information determination unit 213. These pieces of information are coded to the writing-once information code 135 by the coding unit 216. The writing-once data 137 is also coded to the writing-once data code 136 by the coding unit 216. With this processing, coding to the writing-once dot code data 134 is performed. On the basis of this code, the writing-once dot code data 134 is written by the write unit 217.

The information data determined by the data information determination unit 213 is sent to the writing-once inhibit information identification unit 222. The writing-once inhibit information identification unit 222 controls the operation of the write unit 217 depending on whether writing-once inhibit information is included. When writing-once inhibit information is included, the write unit 217 is not operated, so writing-once processing is not performed. When writing-once processing is enabled, the write unit 217 is operated to perform writing-once processing.

As described above, the information code 132 in the dot code data 131 has writing-once inhibit enable or disable information, and the writing-once dot code data 134 has the writing-once information code 135. The writing-once inhibit information identification unit 222 determines the information and controls the write unit 217. With this arrangement, the enable or disable state of writing-once processing of dot code data can be controlled. Therefore, data can be protected.

Figure 11A:
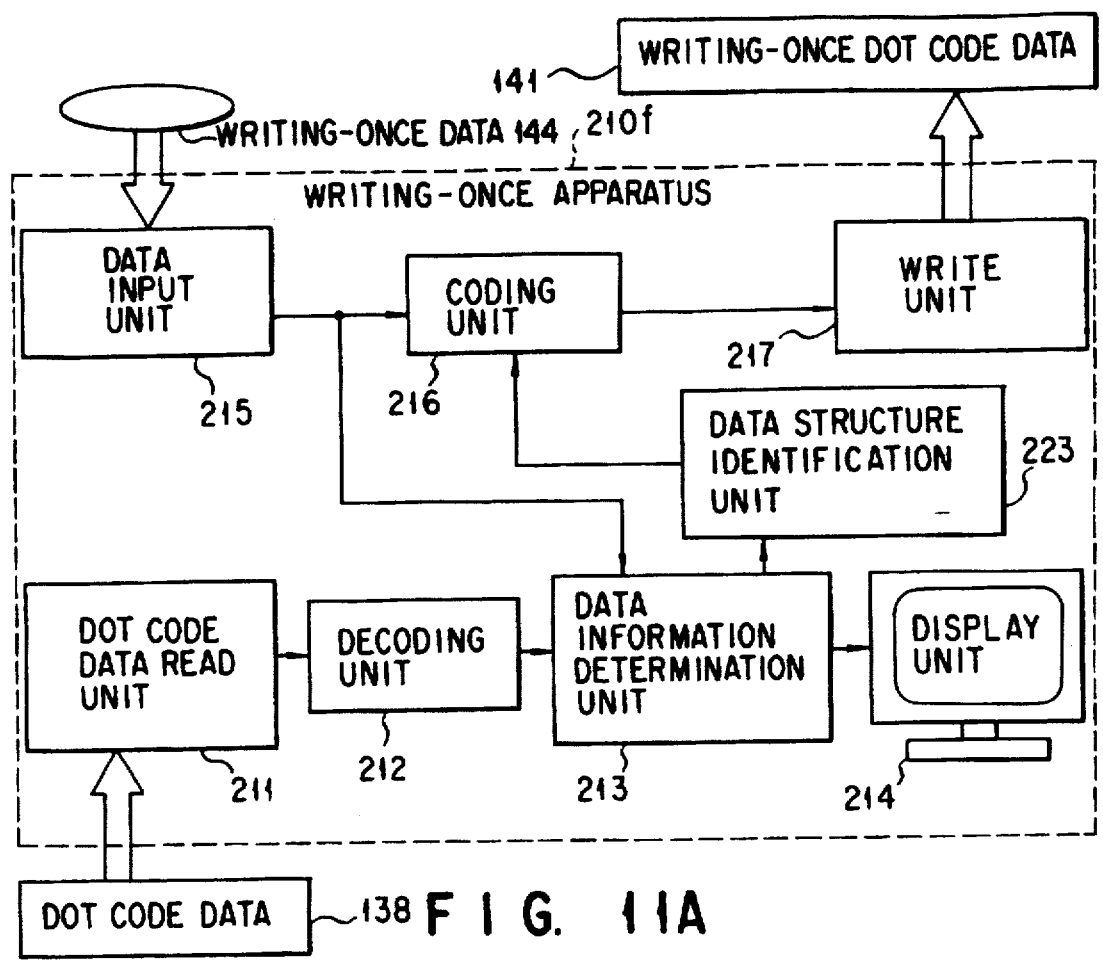
FIG. 11A is a block diagram showing the arrangement of a dot code data writing-once apparatus according to the 13th embodiment of the present invention.
Figure 11B:
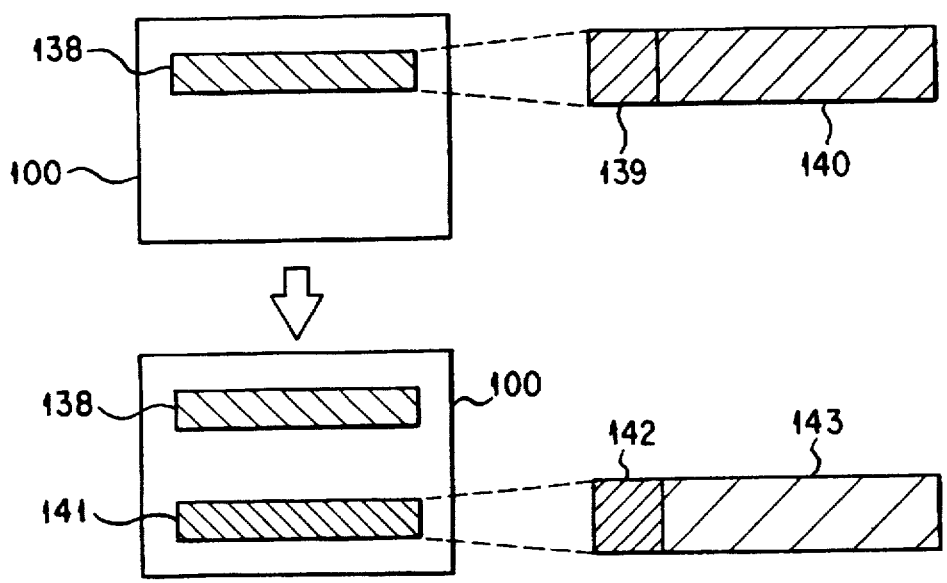
FIG. 11B is a view showing the structure of dot code data.

The 13th embodiment of the present invention will be described below with reference to FIGS. 11A and 11B.

A dot code data writing-once apparatus 210f has a dot code data read unit 211, a decoding unit 212, a data information determination unit 213, a display unit 214, a data input unit 215, a coding unit 216, a data structure identification unit 223 for receiving data from the data information determination unit 213 and outputting control data to the coding unit 216, and a write unit 217.

Dot code data 138 printed on a sheet surface 100 consists of a data structure code 139 and a data code 140. In a writing-once dot code 141, a writing-once information code 142 is located at the start portion, and a writing-once data code 143 is located subsequent to the writing-once information code 142.

The dot code data 138 printed on the sheet surface 100 is read by the dot code data read unit 211. These read codes are decoded by the decoding unit 212 and output to the data information determination unit 213. The data code 140 is converted into preceding data. If the data from the decoding unit 212 is based on the data structure code 139, the data information determination unit 213 outputs the data to the data structure identification unit 223. Upon reception of this information, the data structure identification unit 223 recognizes the code structure of the dot code data 138.

Writing-once data 144 is input from the data input unit 215. The writing-once data 144 and the preceding data are sent to the display unit 214 via the data information determination unit 213 and displayed.

The writing-once information of the writing-once data 144 and the preceding data is determined by the data information determination unit 213. This information is sent to the coding unit 216 via the data structure identification unit 223. The information is coded to the writing-once information code 142. The writing-once data 144 is also coded to the writing-once data code 143 by the coding unit 216.

The coding unit 216 receives the information of the code structure of the dot code data 138 from the data structure identification unit 223, thereby performing coding to the writing-once dot code data 141 having the same code structure as that of the dot code data 138. The write unit 217 receives the writing-once dot code data 141 and writes the writing-once dot code data 141.

As described above, the data structure identification unit 223 for recognizing the code structure of the dot code data 138 and converting writing-once data into the same code structure is arranged. With this arrangement, writing-once processing of dot code data having a code structure corresponding to that of the dot code data 138 can be performed.

Figure 12A:
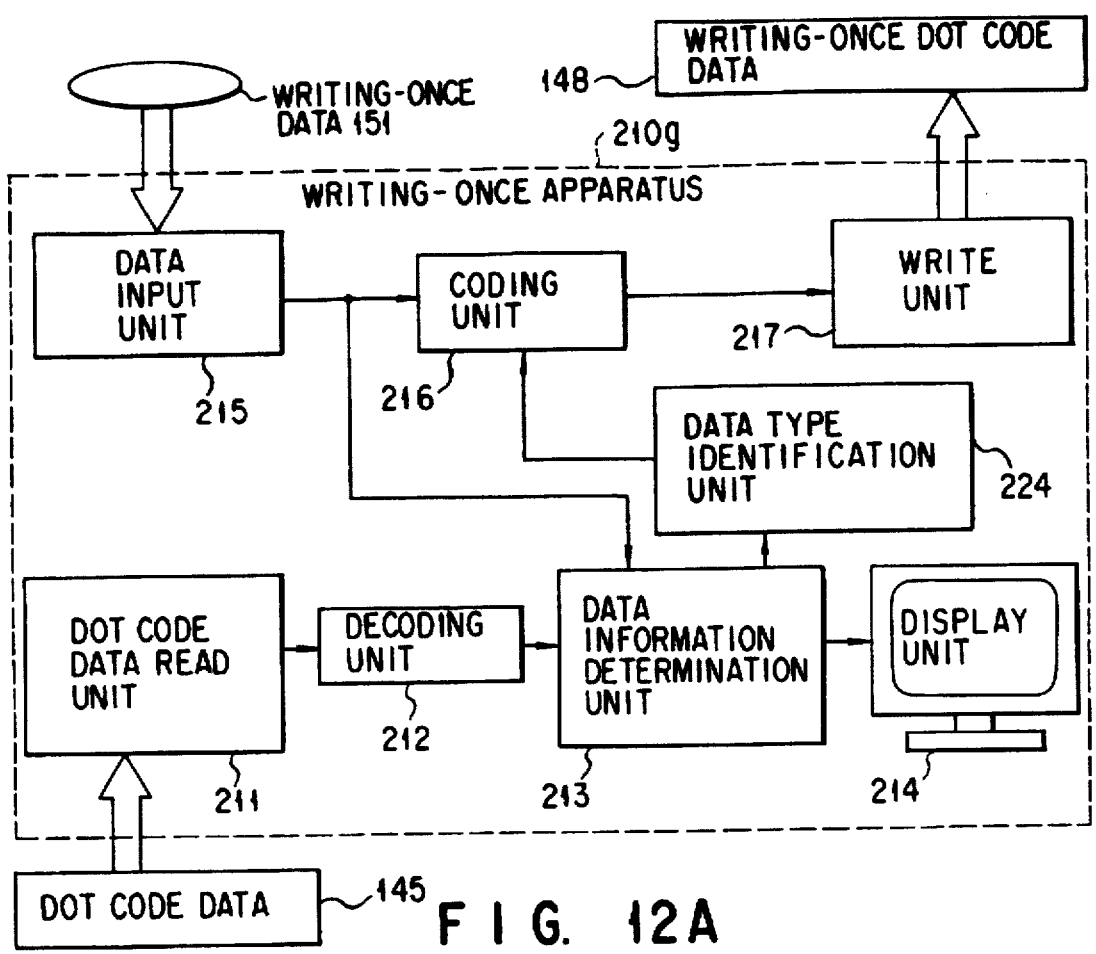
FIG. 12A is a block diagram showing the arrangement of a dot code data writing-once apparatus according to the 14th embodiment of the present invention.
Figure 12B:
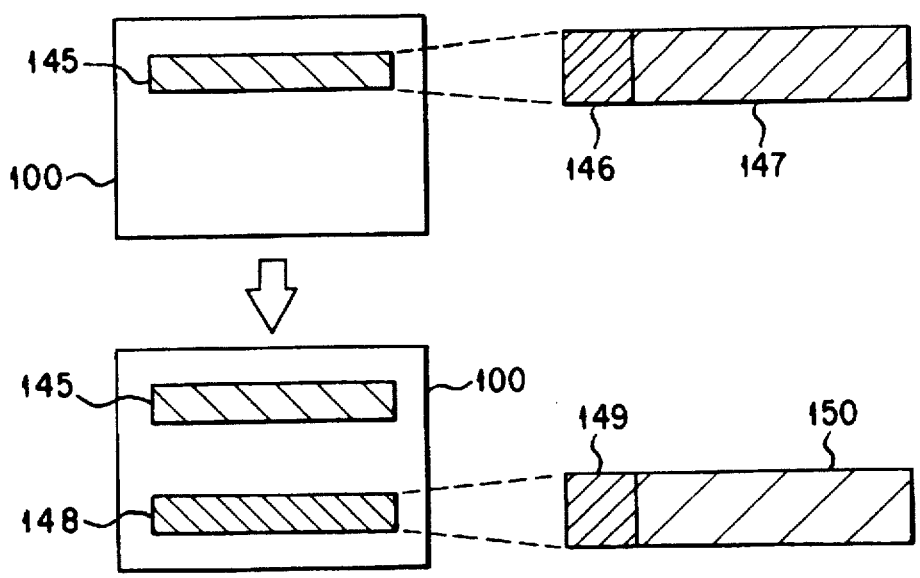
FIG. 12B is a view showing the structure of dot code data.

The 14th embodiment of the present invention will be described below with reference to FIGS. 12A and 12B.

A dot code data writing-once apparatus 210g has a dot code data read unit 211, a decoding unit 212, a data information determination unit 213, a display unit 214, a data input unit 215, a coding unit 216, a data type identification unit 224 for receiving data from the data information determination unit 213 and outputting control data to the coding unit 216, and a write unit 217.

Dot code data 145 printed on a sheet surface 100 consists of data type code 146 representing audio information, image information, or character information, and a data code 147. In writing-once dot code data 148, a writing-once information code 149 is located at the start portion, and a writing-once data code 150 is located subsequent to the writing-once information code 149.

With this arrangement, the dot code data 145 printed on the sheet surface 100 is read by the dot code data read unit 211. These read codes are decoded by the decoding unit 212 and sent to the data information determination unit 213. The data code 147 is converted into preceding data.

If it is determined that the data from the decoding unit 212 is based on the data type code 146, the data information determination unit 213 sends the data to the data type identification unit 224. Upon reception of this information, the data type identification unit 224 recognizes the code type of the dot code data 145.

Writing-once data 151 is input from the data input unit 215. The writing-once data 151 and the preceding data are sent to the display unit 214 via the data information determination unit 213 and displayed.

The writing-once information of the writing-once data 151 and the preceding data are determined by the data information determination unit 213. This information is sent to the coding unit 216 via the data type identification unit 224 and coded to the writing-once information code 149. The writing-once data 151 is also coded to the writing-once data code 150 by the coding unit 216. The coding unit 216 receives the information of the code type of dot code data 145 from the data type identification unit 224, thereby performing coding to the writing-once data 148 having the same code type as that of the dot code data 145. The write unit 217 receives the writing-once dot code data 148 and writes the writing-once dot code data 148.

As described above, the data type identification unit 224 for recognizing the code type of the dot code data 145 having a predetermined type corresponding to audio information, image information, or character information and converting writing-once data into the same code type is arranged. With this arrangement, the same code type as that of audio information, image information, or character information according to the dot code data 145 can be easily determined. Therefore, writing-once processing of dot code data of the same type can be easily performed.

The 15th embodiment of the present invention will be described below with reference to FIG. 13.

A dot code data writing-once apparatus 210h has a dot code data read unit 211, a decoding unit 212, a data information determination unit 213, a display unit 214, a data input unit 215, a coding unit 216, a data type identification unit 224, a data-associated information preparation unit 225 for receiving data from the data type identification unit 224 and outputting control data to the coding unit 216, and a write unit 217.

With this arrangement, dot code data 145 printed on a sheet surface 100 is read by the dot code data read unit 211. These read codes are decoded by the decoding unit 212 and sent to the data information determination unit 213. A data code 147 is converted into preceding data.

If the data information determination unit 213 determines that the data from the decoding unit 212 is based on the data type code 146, the data is sent to the data type identification unit 224. Upon reception of this information, the data type identification unit 224 recognizes the code type of the dot code data 145.

Writing-once data 151 is input from the data input unit 215. The writing-once data 151 and the preceding data are sent to the display unit 214 via the data information determination unit 213 and displayed. If the data information determination unit 213 determines that the data from the data input unit 215 is writing-once data type information, the data is sent to the data type identification unit 224. Upon reception of this information, the data type identification unit 224 recognizes the code type of writing-once dot code data 148.

The writing-once information of the writing-once data 151 and the preceding data are determined by the data information determination unit 213. On the basis of this information, the data type identification unit 224 determines whether each data is image data, audio data, or character data. The result is output to the data-associated information preparation unit 225.

The data-associated information preparation unit 225 prepares the association and correlation between the data of different types and sends the information to the coding unit 216. This information is coded to a writing-once information code 149 by the coding unit 216. The writing-once data 151 is also coded to a writing-once data code 150 by the coding unit 216.

The coding unit 216 prepares the writing-once dot code data 148 of a type different from that of the dot code data

145. The write unit 217 receives the writing-once dot code data 148 and writes the writing-once dot code data 148.

As described above, the data type identification unit 224 for recognizing the code type of the dot code data 145 having a predetermined type corresponding to audio information, image information, or character information, and the data-associated information preparation unit 225 for preparing association and correlation between different code types are arranged. With this arrangement, writing-once processing of the writing-once dot code data 148 of a type different from that of the dot code data 145 can be performed. As a result, in audio information, image information, or character information, writing-once processing of dot code data can be performed on the basis of correlation between various data of different types.

According to the eighth to 15th embodiments of the present invention, the following arrangements can be obtained.

(1) A code data writing-once apparatus comprising read means for reading code data printed and recorded on a sheet surface from which one of audio information, image information, and character information can be optically read, decoding means for decoding the code data read by the read means, input means for inputting writing-once data, determination means for determining the code data decoded by the decoding means and the data input from the input means to arrange a writing-once area in the code data, coding means for coding the data to the writing-once code data in the writing-once area arranged by the determination means, the data being input from the input means, and write means for writing the writing-once code data coded by the coding means.

(2) A code data writing-once apparatus according to the arrangement (1), further comprising block processing means for performing block processing of the code data in units of blocks, and wherein the determination means arranges the writing-once area between the blocks to enable writing-once processing of fixed-length data as a block.

(3) A code data writing-once apparatus according to the arrangement (1), further comprising index processing means for arranging an index in the code data, and wherein the determination means arranges a writing-once information area for the index to enable writing-once processing of data in an indefinite amount.

(4) A code data writing-once apparatus according to the arrangement (1), further comprising data position determination means for arranging position information of the writing-once area at an end of the code data, so that write access of a writing-once data amount with a high degree of freedom is enabled.

(5) A code data writing-once apparatus comprising read means for reading code data printed and recorded on a sheet surface from which one of audio information, image information, and character information can be optically read, decoding means for decoding the code data read by the read means, input means for inputting writing-once data, determination means for determining the code data decoded by the decoding means and the data input from the input means to arrange a writing-once area in the code data, coding means for coding the data to the writing-once code data in the writing-once area arranged by the determination means, the data being input from the input means, writing-once information identification means for identifying, on the basis of information from the determination means, whether writing-once processing in the writing-once area is enabled, and write means for writing the writing-once code data coded by the coding means when the writing-once information identification means identifies that writing-once processing is enabled.

(6) A code data writing-once apparatus comprising read means for reading code data printed and recorded on a sheet surface from which one of audio information, image information, and character information can be optically read, decoding means for decoding the code data read by the read means, input means for inputting writing-once data, determination means for determining the code data decoded by the decoding means and the data input from the input means to arrange a writing-once area in the code data, coding means for coding the data to the writing-once code data in the writing-once area arranged by the determination means, the data being input from the input means, data structure identification means for identifying a data structure of the writing-once code data on the basis of information from the determination means to identify whether writing-once processing according to the data structure is enabled, and write means for writing the writing-once code data coded by the coding means when the data structure identification means identifies that writing-once processing is enabled.

(7) A code data writing-once apparatus according to the arrangement (6), further comprising determination means for determining a data type of the writing-once code data in accordance with one of audio information, image information, and character information, so that the type of the writing-once data can be determined by the determination means in accordance with the type of the writing-once data.

(8) A code data writing-once apparatus comprising read means for reading code data printed and recorded on a sheet surface from which one of audio information, image information, and character information can be optically read, decoding means for decoding the code data read by the read means, input means for inputting writing-once data, determination means for determining the code data decoded by the decoding means and the data input from the input means to arrange a writing-once area in the code data, coding means for coding the data to the writing-once code data in the writing-once area arranged by the determination means, the data being input from the input means, data type identification means for identifying a data type of the writing-once code data on the basis of information from the determination means, determination means for determining a relationship between preceding code data and the writing-once code data, which are identified by the data type identification means, and write means for writing the writing-once code data coded by the coding means in accordance with the relationship determined by the determination means.

According to the arrangement (1), preceding code data is read and decoded. Thereafter, the writing-once area is determined and displayed. The input writing-once data is coded, the writing-once area and the writing-once information are determined, and the writing-once code data is written. Therefore, code data writing-once processing to the code data can be performed.

According to the arrangement (2), preceding code data is read and decoded, and the writing-once area is determined and displayed. The writing-once area and the writing-once information for the input writing-once data are determined. Block processing is performed, and the information is coded. Thereafter, the writing-code data is read. Therefore, code data writing-once processing of fixed-length data as a block to the code data can be easily performed.

According to the third arrangement (3), preceding code data is read and decoded, and the writing-once area is determined and displayed. The writing-once area and the writing-once information for the input writing-once data are determined. The writing-once information is written in the index, the writing-once data is coded, and the writing-once code data is written. Therefore, code data writing-once processing of data in an indefinite amount can be easily performed.

According to the arrangement (4), preceding code data is read, decoded, and displayed. The writing-once area and the writing-once information for the input writing-once code data are determined and coded. Thereafter, the writing-once code data is written at the end of the code. Therefore, code data can be written with a high degree of freedom of the writing-once data amount, and code data writing-once processing can be easily performed.

According to the arrangement (5), preceding code data is read and decoded, and the writing-once area is determined and displayed. In accordance with information from the determination means, the writing-once information identification means determines whether writing-once processing can be performed. If impossible, writing-once processing is not performed. If possible, the input writing-once data is coded. The writing-once area and the writing-once information are determined, and the writing-once code data is written. Therefore, the enable or disable state of code data writing-once processing to the code data can be controlled. Therefore, the data can be protected.

According to the arrangement (6), preceding code data is read and decoded, and the writing-once area is determined and displayed. Identification and matching are performed for the input writing-once data and the data structure read in advance. The input writing-once data is coded, the writing-once area and the writing-once information are determined, and the writing-once code data is written. Therefore, a writing-once operation of the code data can be easily performed in accordance with the data structure.

According to the arrangement (7), preceding code data is read and decoded, and the writing-once area is determined and displayed. Identification and matching are performed for the input writing-once data and the data type read in advance. The input writing-once data is coded, the writing-once area and the writing-once information are determined, and the writing-once code data is written. Therefore, a writing-once operation of the code data can be easily performed in accordance with the data type of audio information, image information, or character information.

According to the arrangement (8), preceding code data is read and decoded, and the writing-once area is determined and displayed. The input writing-once data and the data type read in advance are identified, and a relationship therebetween is established. The information and the input writing-once data are coded, the writing-once area and the writing-once information are determined, and the writing-once code data is written. Therefore, writing-once processing to the code data can be performed on the basis of the relationship between various data of different types can be performed.

As described above, according to the eighth to 15th embodiments of the present invention, a code data writing-once apparatus which can perform further code data writing-once processing to the code data can be provided.

In addition, according to the eighth to 15th embodiments of the present invention, a code data writing-once apparatus which can determine discrimination or relationship between original information and writing-once information and has information as writing-once information can be provided.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. A code data writing-once apparatus for recording code data that is optically readable, comprising:

a reader for optically reading code data recorded on a recording medium, the read code data representing at least one of audio information, image information, and character information, the code data formed by a plurality of recorded data blocks with each block containing data having a fixed length, and a plurality of unrecorded writing-once blocks as writing-once areas for data having a fixed length;

a decoder for decoding the code data read by said reader;

a data inputting device for inputting writing-once data as code data;

a coding unit for coding the writing-once data input by said data inputting device and the code data decoded by said decoder, as writing-once code data; and a writing device for writing the writing-once code data coded by said coding unit on the recording medium;

a determination unit for determining one of the writing-once blocks, as an arrangement position in which the writing-once code data of the data input by said data inputting device is to be written by said writing device, according to the data decoded by said decoder; and said coding unit coding the data input by said data inputting device and the data decoded by said decoder, according to the writing-once block determined by said determining unit, thereby permitting writing of the data input by said data inputting device as writing-once code data.

2. The apparatus according to claim 1, wherein the data blocks of the code data include information regarding the arrangement position of the writing-once code data of the data input by said data inputting device.

3. The apparatus according to claim 1, wherein the data blocks of the code data have the same sizes as the unrecorded writing-once blocks.

4. The apparatus according to claim 1, wherein the unrecorded writing-once blocks are provided such that each of the unrecorded writing-once blocks is located between an associated two of the data blocks of the code data, respectively.

* * * * *